(12) United States Patent
Lin

(10) Patent No.: US 9,822,567 B1
(45) Date of Patent: Nov. 21, 2017

(54) HINGE ASSEMBLY

(71) Applicant: FIRST DOME CORPORATION, New Taipei (TW)

(72) Inventor: Yuan-Ming Lin, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 15/480,826

(22) Filed: Apr. 6, 2017

(30) Foreign Application Priority Data

Nov. 17, 2016 (TW) .............................. 105217538 U

(51) Int. Cl.
*E05D 11/06* (2006.01)
*G06F 1/16* (2006.01)
*E05D 11/08* (2006.01)

(52) U.S. Cl.
CPC ............ *E05D 11/06* (2013.01); *E05D 11/087* (2013.01); *G06F 1/1681* (2013.01); *E05Y 2900/606* (2013.01); *Y10T 16/5406* (2015.01)

(58) Field of Classification Search
CPC ......... E05D 11/06; E05D 11/087; E05D 3/18; E05Y 2900/606; G06F 1/1681; G06F 1/1616; H04M 1/0216; H04M 1/0214; F16M 11/10; Y10T 16/5406; Y10T 16/544; Y10T 16/5387; Y10T 16/540255
USPC .......... 16/348, 357, 303, 330; 248/917, 922, 248/923; 403/116; 361/679.27
See application file for complete search history.

(56) References Cited

U.S. PATENT DOCUMENTS

| | | | |
|---|---|---|---|
| 8,713,757 B2* | 5/2014 | Chen ..................... | G06F 1/1616 16/327 |
| 9,501,108 B2* | 11/2016 | Lee ......... | G06F 1/1601 |
| 2015/0212553 A1* | 7/2015 | Park ..................... | G06F 1/1615 361/679.27 |
| 2015/0342067 A1* | 11/2015 | Gault .................. | H05K 5/0226 248/357 |
| 2016/0090767 A1* | 3/2016 | Park ....................... | E05D 11/10 16/319 |
| 2016/0202733 A1* | 7/2016 | Ho ........................ | G06F 1/1656 361/679.12 |
| 2016/0216742 A1* | 7/2016 | Lee ........................ | F16M 11/38 |

* cited by examiner

*Primary Examiner* — William Miller
(74) *Attorney, Agent, or Firm* — Michael Best & Friedrich LLP

(57) ABSTRACT

A hinge assembly includes a guiding unit connected between and slidable relative to first and second hinge units along arcuate lines. The second hinge unit has a pivot shaft extending through first and second rings, and a resilient washer. The second ring is rotatable on the pivot shaft relative to the first ring and has a radial extension member telescopically connected to a pivotal arm of the first hinge unit. The resilient washer pushes the second ring against the first ring. A protrusion of the first ring slides along a contact surface of the second ring having a groove so that a variable friction toque is created against relative movement of the first and second hinge units.

8 Claims, 16 Drawing Sheets

HINGE ASSEMBLY

CROSS-REFERENCE TO RELATED APPLICATION

This application claims priority to Taiwanese Patent Application No. 105217538, filed on Nov. 17, 2016.

FIELD

The disclosure relates to a hinge assembly, and more particularly to a hinge assembly capable of providing stable frictional torque.

BACKGROUND

Referring to FIGS. 1 and 2, an existing tablet computer 7 includes a main body 71, a kickstand 72, and a hinge assembly 73 connecting the kickstand 72 to the main body 72. With the hinge assembly 73, the kickstand 72 is pivotal relative to the main body 71 to adjust an angle between the main body 71 and the kickstand 72 so that the tablet computer 7 may be placed on a desktop at a desired inclined position.

As shown in FIGS. 3 and 4, the hinge assembly 73 includes a first hinge unit 731, a second hinge unit 733, and a guiding unit 732. The first and second hinge units 731, 733 are slidably connected to each other by the guiding unit 732. The second hinge unit 733 is slidable relative to the guiding unit 732, and includes a hinge body 733$b$, a pivot shaft 733$c$ and an eccentric extension member 733$d$. The hinge body 733$b$ has an installing space 733$a$. The pivot shaft 733$c$ is connected to the hinge body 773$b$ and is disposed in the installing space 733$a$. The eccentric extension member 733$d$ is eccentrically and rotatably sleeved on the pivot shaft 733$c$ and has an end pivotally connected to the first hinge unit 731. Because the eccentric extension member 733$d$ is eccentrically rotatable relative to the pivot shaft 733$c$, a torsional force is unevenly generated by the hinge assembly 73 for supporting the main body 71. With the use of the eccentric extension member 733$d$, when the angle between the kickstand 72 and the main body 71 is increased, application force required to operate the kickstand 72 is increased. However, because no clearance exists between the eccentric extension member 733$d$ and the pivot shaft 733$c$, the friction torque created by the eccentric extension member 733$d$ is unstable due to wear caused between the eccentric extension member 733$d$ and the pivot shaft 733$c$. After the wear occurs for a long period, the application force required to operate the kickstand 72 becomes high and low irregularly.

SUMMARY

Therefore, an object of the disclosure is to provide a hinge assembly that can provide a stable torsional force.

According to the disclosure, a hinge assembly includes a first hinge unit, a guiding unit and a second hinge unit.

The first hinge unit has an accommodating space and a pivotal arm.

The guiding unit is movably disposed in the accommodating space, is slidably connected to the first hinge unit to slide relative to the first hinge unit along an arcuate line.

The second hinge unit is slidably connected to the guiding unit to slide relative to the guiding unit along an arcuate line. The second hinge unit includes a second hinge body, a pivot shaft, a first ring, a second ring, at least one friction washer, a protrusion-and-groove arrangement, at least one resilient washer and an extension member.

The second hinge body has an installing space.

The pivot shaft is connected to the second hinge body and is disposed in the installing space.

The first ring is sleeved on the pivot shaft, is non-rotatable relative to the pivot shaft, and has a first contact surface.

The second ring is sleeved on the pivot shaft, is rotatable relative to the pivot shaft, and has a second contact surface abutting the first contact surface of the first ring.

The least one friction washer is fitted around the pivot shaft and abuts a third contact surface of the second ring opposite to the second contact surface.

The protrusion-and-groove arrangement is disposed on the first and second contact surfaces to push the second ring against the at least one friction washer.

The least one resilient washer is sleeved on the pivot shaft to resiliently push the at least one friction washer against the third contact surface.

The extension member extends radially and outwardly from the second ring and telescopically connected to the pivotal arm.

The second hinge unit is rotatable relative to the first hinge unit between a fully folded state and a fully unfolded state.

In the fully folded state, the second hinge unit and the guiding unit are entirely accommodated in the accommodating space, and the extension member and the pivotal arm are in a retracting state.

In the fully unfolded state, most part of each of the second hinge unit and the guiding unit is positioned away from the accommodating space, and the extension member and the pivotal arm are in an extended state.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
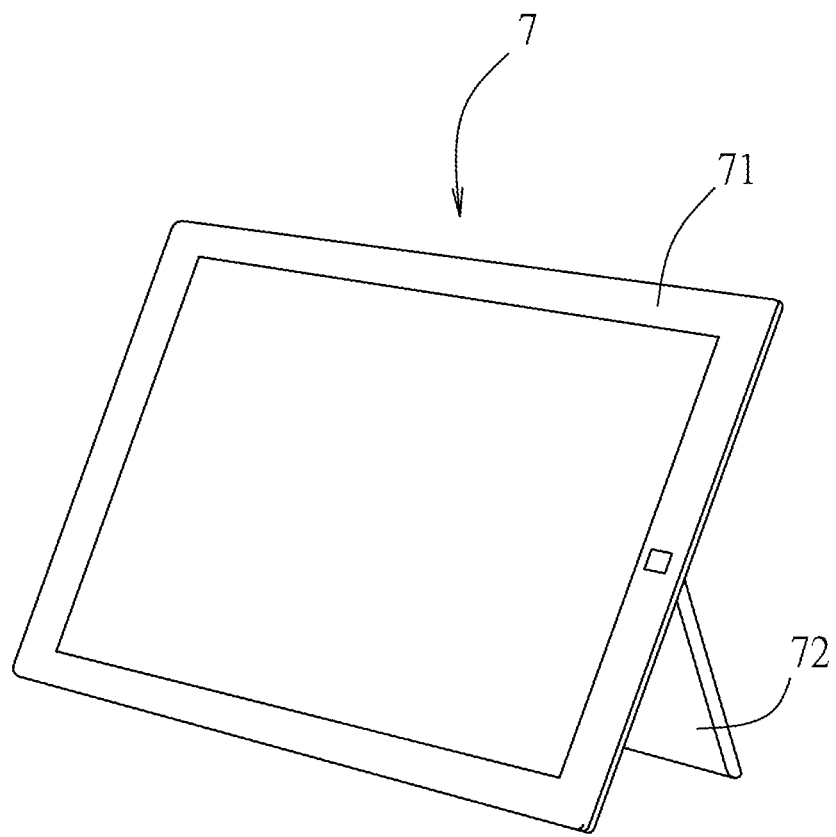
FIG. 1 is a perspective view of an existing tablet computer.
Figure 2:
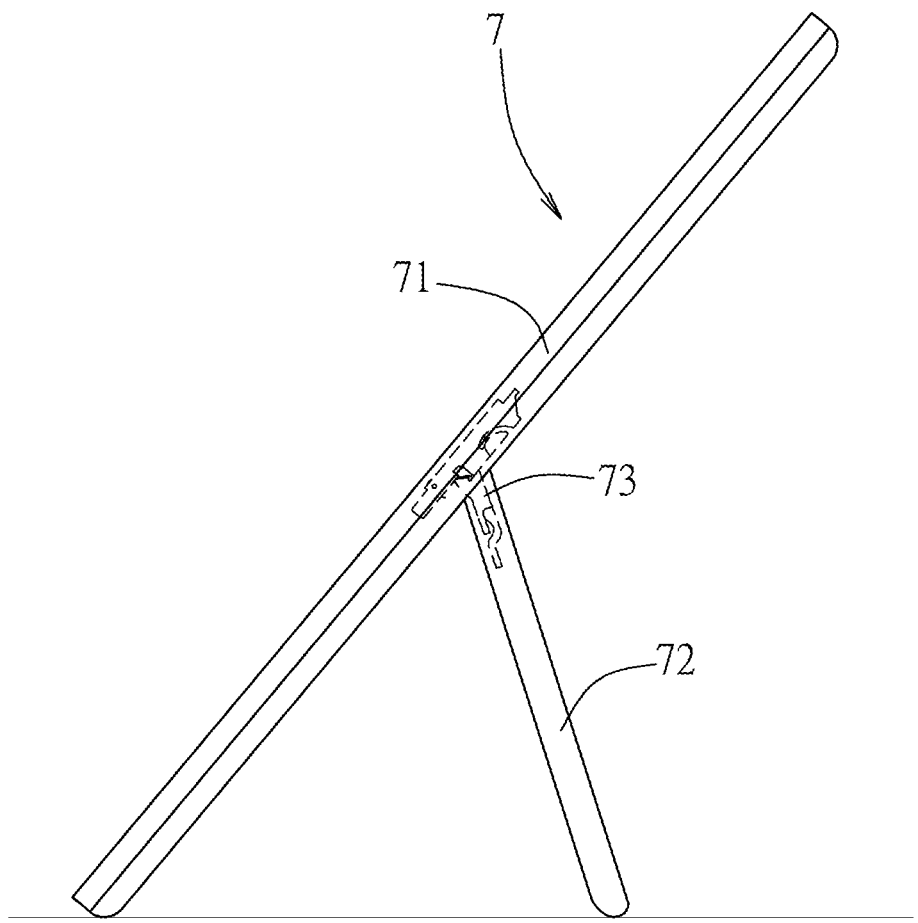
FIG. 2 is a side view of the existing tablet computer.
Figure 3:
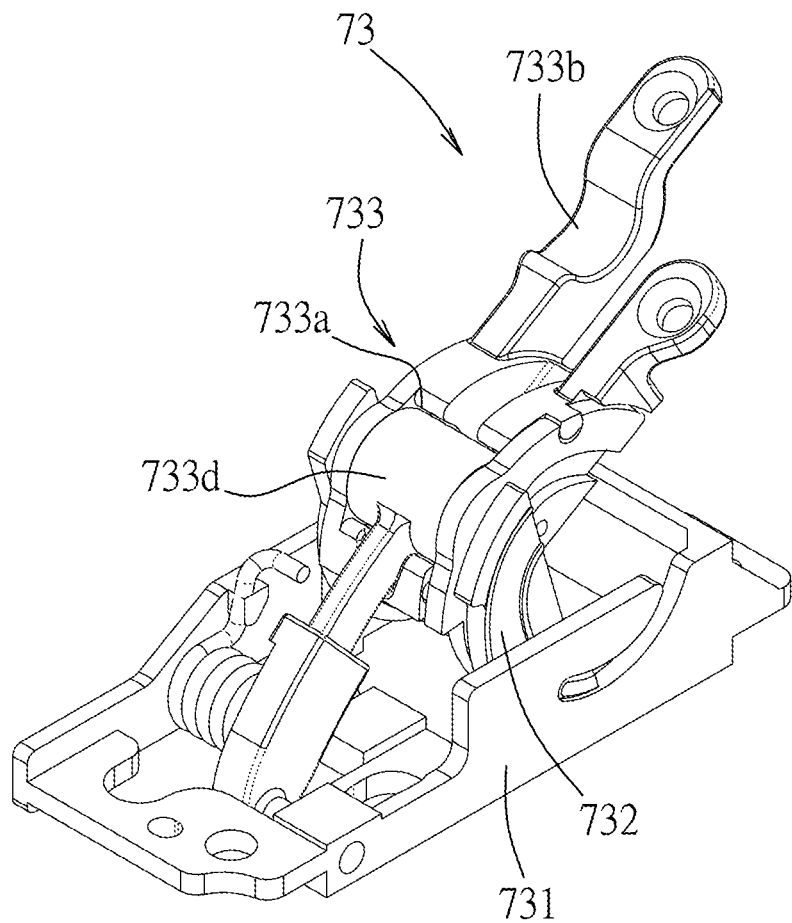
FIG. 3 is a perspective view, illustrating a hinge assembly of the existing tablet computer.
Figure 4:
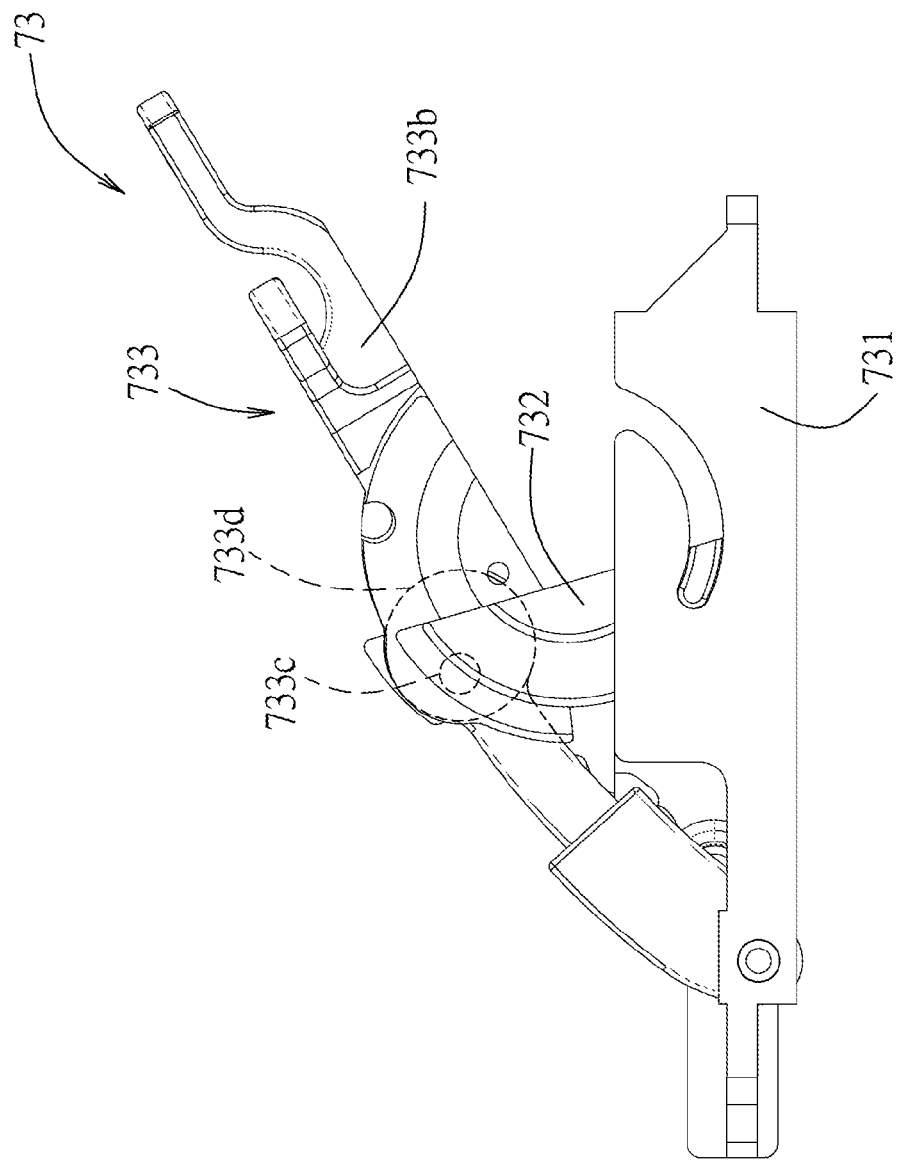
FIG. 4 is a side view of FIG. 3.
Figure 5:
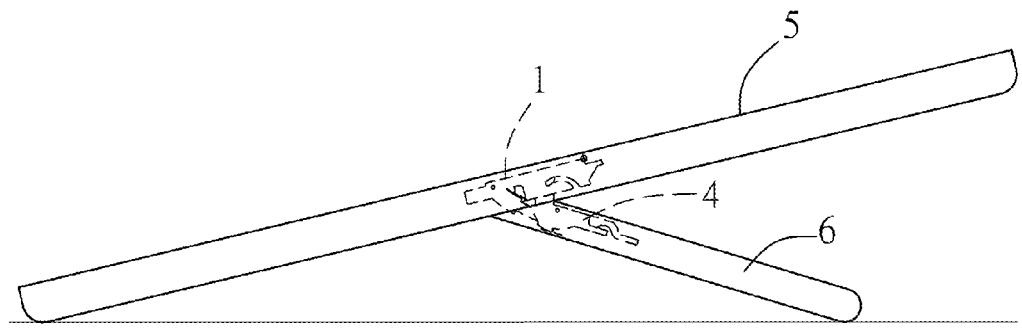
FIG. 5 is a side view of an electronic device incorporating a hinge assembly according to an embodiment of the present disclosure.
Figure 6:
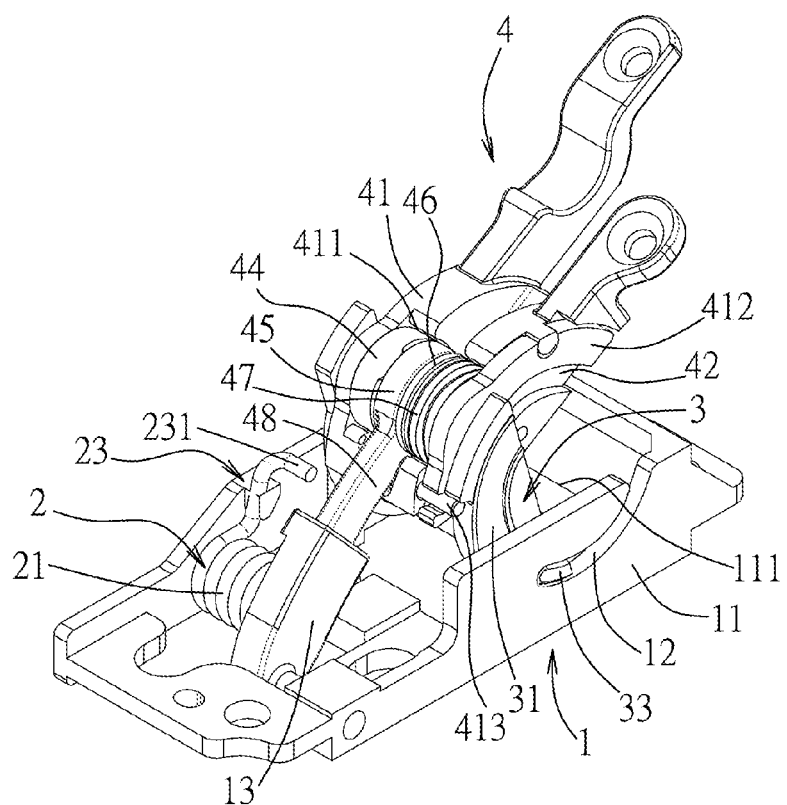
FIG. 6 is a perspective view of the hinge assembly of the embodiment.

Referring to FIGS. 5 and 6, a hinge assembly according to an embodiment of the present disclosure includes a first hinge unit 1 connects an electronic device 5, a torsional spring 2 disposed in the first hinge unit 1, a guiding unit 3 movably disposed in the first hinge unit 1, and a second hinge unit 4 slidably connected to the guiding unit 3 and mounted to a kickstand 6. Through the hinge assembly of the present disclosure, the kickstand 6 can be arbitrarily adjusted and moved angularly relative to the electronic device 5, such as a tablet computer, a smart phone, an LCD display, etc.

Figure 7:
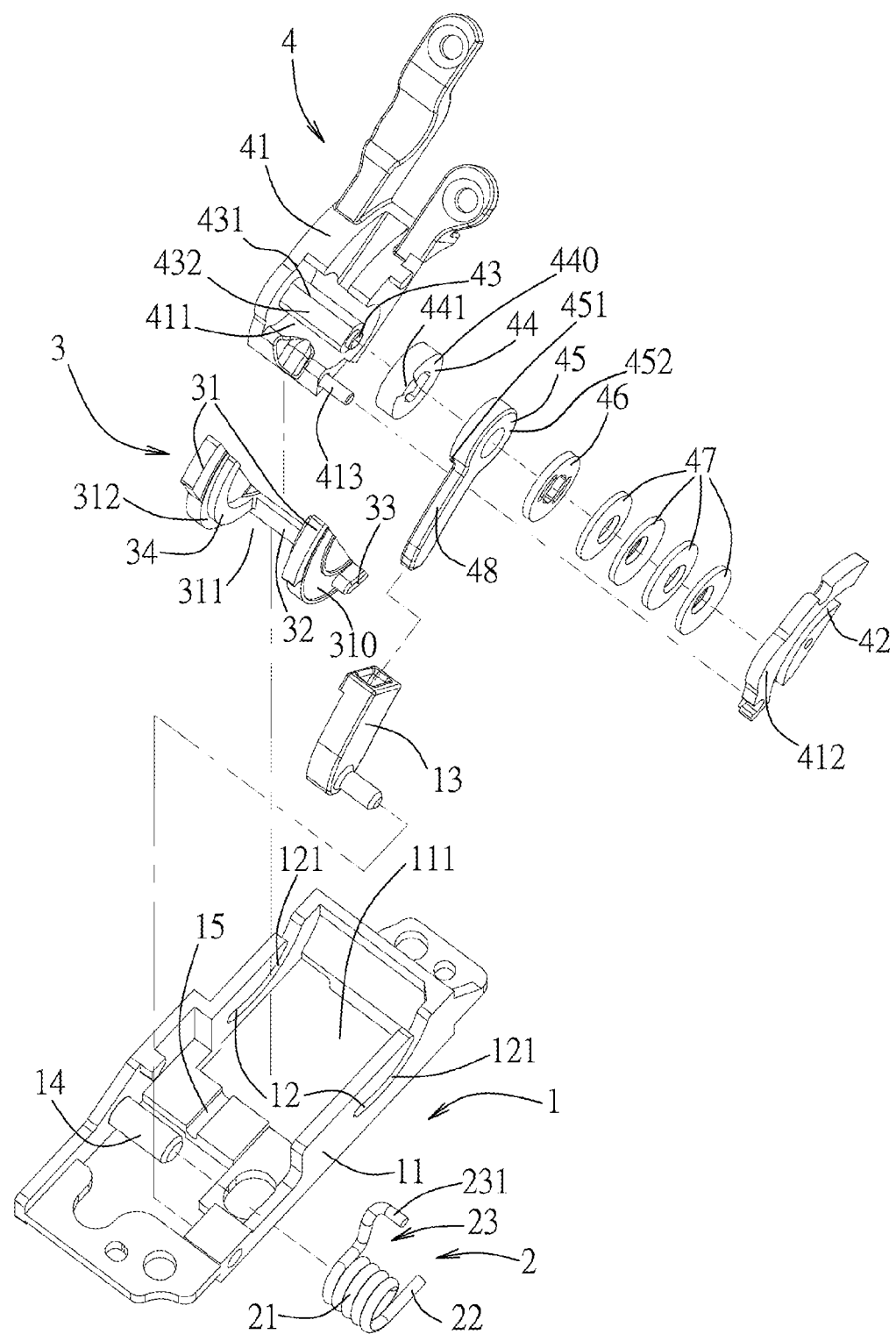
FIG. 7 is an exploded view of the hinge assembly of the embodiment.
Figure 8:
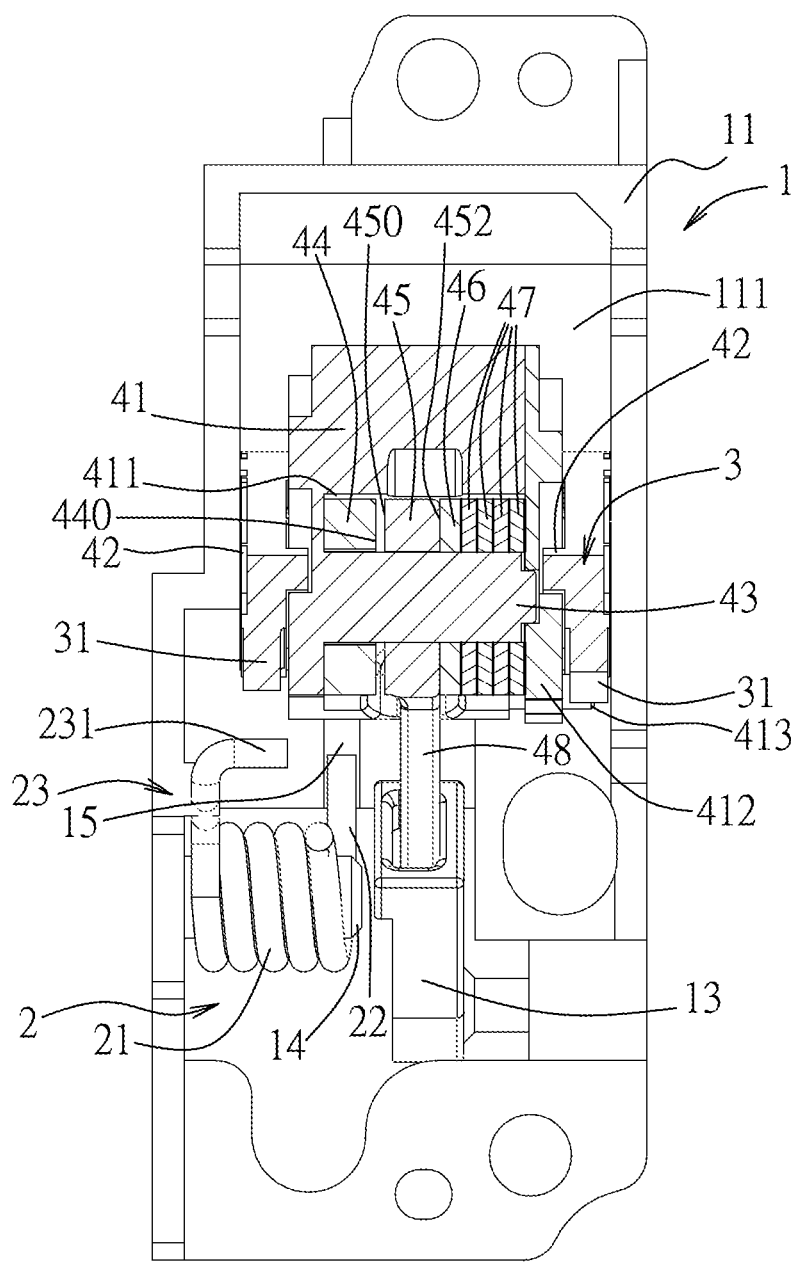
FIG. 8 is a partly sectional view of the hinge assembly of the embodiment.

Referring FIGS. 7 and 8, in combination with FIG. 6, the first hinge unit 1 includes a first hinge body 11 having an accommodating space 111, two opposite first side plates 12 disposed respectively at two opposite sides of the first hinge body 11, two arcuate first sliding rails 121 formed respectively in the first side plates 12, a pivotal arm 13 being formed as a sleeve that is pivoted to the first hinge body 11, a supporting post 14 extending from one of the two opposite sides of the first hinge body 11, and a recessed abutment face 15 disposed between the two opposite sides of the first hinge body 11. The accommodating space 111 is disposed between the first slide plates 12.

The torsional spring 2 has a coiled body 21, an inner free end 22 and an outer free end 23. The coiled body 21 is sleeved on the supporting post 14. The inner free end 22 extends from the coiled body 21, and abuts against the recessed abutment face 15. The outer free end 23 extends from the coiled body 21, and has a bent portion 231.

The guiding unit 3 is slidably connected to the first hinge unit 1 to slide relative to the first hinge unit 1 along an arcuate line. In this embodiment, the guiding unit 3 includes two semi-circular plate bodies 31, and a connection rod 32 interconnecting the plate bodies 31. Each plate body 31 has a first plate surface 310 in abutment with one of the first slide plates 12, a second plate surface 312 opposite to the first plate surface 310, a first projection 33 extending from the first plate surface 310 into one of the first sliding rails 121, and a second projection 34 extending from the second plate surface 312. The plate bodies 31 and the connection rod 32 cooperatively define a receiving space 311.

The second hinge unit 4 is slidable relative to the guiding unit 3 along an arcuate line, and is rotatable relative to the first hinge unit 1. In this embodiment, the second hinge unit 4 includes a second hinge body 41, two opposite second side plates 412, a pivot shaft 43, a first ring 44, a second ring 45, a friction washer 46, a protrusion-and-groove arrangement, four resilient washers 47, an extension member 48 and a retaining post 413.

The second hinge body 41 has an installing space 411.

The two opposite second side plates 412 are disposed respectively at two opposite sides of the second hinge body 41, and are respectively formed with arcuate second sliding rails 42. In this embodiment, the second plate surface 312 of each plate body 31 is in abutment with one of the opposite second slide plates 412. The second projection 34 of each plate body 31 extends into one of the second sliding rails 42.

The pivot shaft 43 is connected to the second hinge body 41 and is disposed in the installing space 411. The pivot shaft 43 has two curved surfaces 431 and two planar surfaces 432 each of which interconnects the curved surfaces 431. In this embodiment, the pivot shaft 43 is connected between the second side plates 412. Specifically, the pivot shaft 43 has one end fixed to one of the second side plates 412 that is fixed to the second hinge body 41. The other one of the second side plates 412 is removably connected to another end of the pivot shaft 43.

The first ring 44 has a first contact surface 440 and a sleeving hole in interference fit with the pivot shaft 43. The first ring 44 is sleeved on and is non-rotatable relative to the pivot shaft 43.

The second ring 45 has a second contact surface 450 abutting the first contact surface 440, and a sleeving hole in clearance fit with the pivot shaft 43. The second ring 45 is sleeved on and is rotatable relative to the pivot shaft 43.

The friction washer 46 is tightly fitted around the pivot shaft 43 and abuts a third contact surface 452 of the second ring 45 opposite to the second contact surface 450. The friction washer 46 has a washer hole in interference fit with the pivot shaft 43.

The protrusion-and-groove arrangement is disposed on the first and second contact surfaces 440, 450 to push the second ring 45 against the at least one friction washer 46. The protrusion-and-groove arrangement has a protrusion 441 projecting from the first contact surface 440 toward the second contact surface 450, and a groove 451 formed in the second contact surface 450 to receive the protrusion 441. The protrusion 441 is slidable on the second contact surface 450 and in the groove 451 when the second hinge unit 4 rotates relative to the first hinge unit 1.

The resilient washers 47 are sleeved on the pivot shaft 43 to resiliently push the friction washer 46 against the third contact surface 452. Each resilient washer 47 has a dish-shaped configuration. Each resilient washer 47 is deformed when being compressed, and provide a returning force when being uncompressed.

The extension member 48 extends radially and outwardly from the second ring 45. The pivot arm 13 is sleeved telescopically on the extension member 48.

The retaining post 413 extends from one of the opposite sides of the second hinge body 41. In this embodiment, the retaining post 413 extends through the one of the second side plates 412 removably connected to the pivot shaft 43.

While, in this embodiment, the first ring 44, the second ring 45, the friction washer 46, the protrusion-and-groove arrangement, and the resilient washers 47 are sleeved on the pivot shaft 43 in a sequential arrangement, such a sequential arrangement may vary.

Referring to FIGS. 9 to 18, the second hinge unit 4 is rotatable relative to the first hinge unit 1 to move to a fully folded state, a first intermediate state, a second intermediate state and a fully unfolded state.

Figure 12:
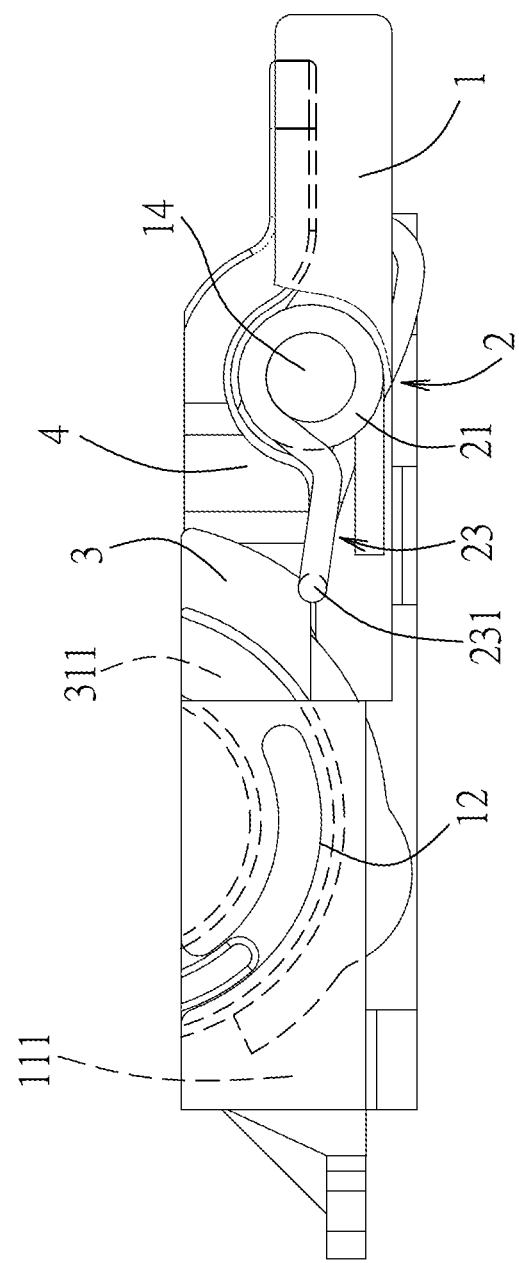
FIG. 12 is another side view, illustrating the hinge assembly of the embodiment in a fully folded state.

In the fully folded state (see FIGS. 10 and 11), the second hinge unit 4 is received in the receiving space 311 of the guiding unit 3, the guiding unit 3 is entirely accommodated in the accommodating space 111, the groove 451 receives the protrusion 441, the extension member 48 and the pivotal arm 13 are in a retracting state, and the bent portion 231 of the torsional spring 2 is compressed and deformed by the second hinge unit 4 (see FIG. 12). Because the protrusion 441 extends into the groove 451, the normal force imparted by the resilient washers 47 to the second ring 45 is relatively small. If a fastener device, such as a magnetic snap (not shown), fastening together the electronic device 5 and the kickstand 6 is released, a restoring force generated by the bent portion 231 of the torsional spring 2 can automatically move the second hinge unit 4 away from the fully folded state.

Figure 9:
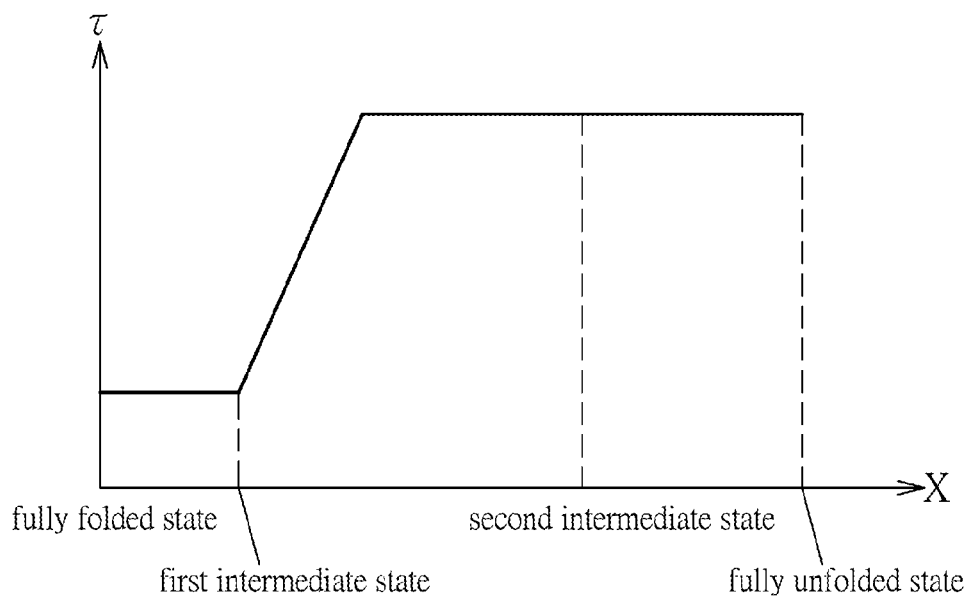
FIG. 9 is a graph, illustrating the relationship between the application torque required to operate a kickstand and the position of the hinge assembly of the embodiment.
Figure 10:
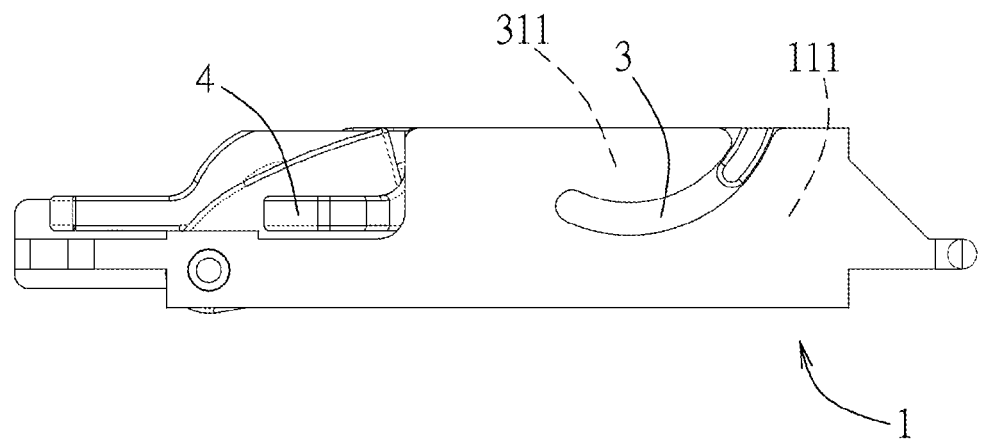
FIG. 10 is a side view, illustrating the hinge assembly of the embodiment in a fully folded state.
Figure 11:
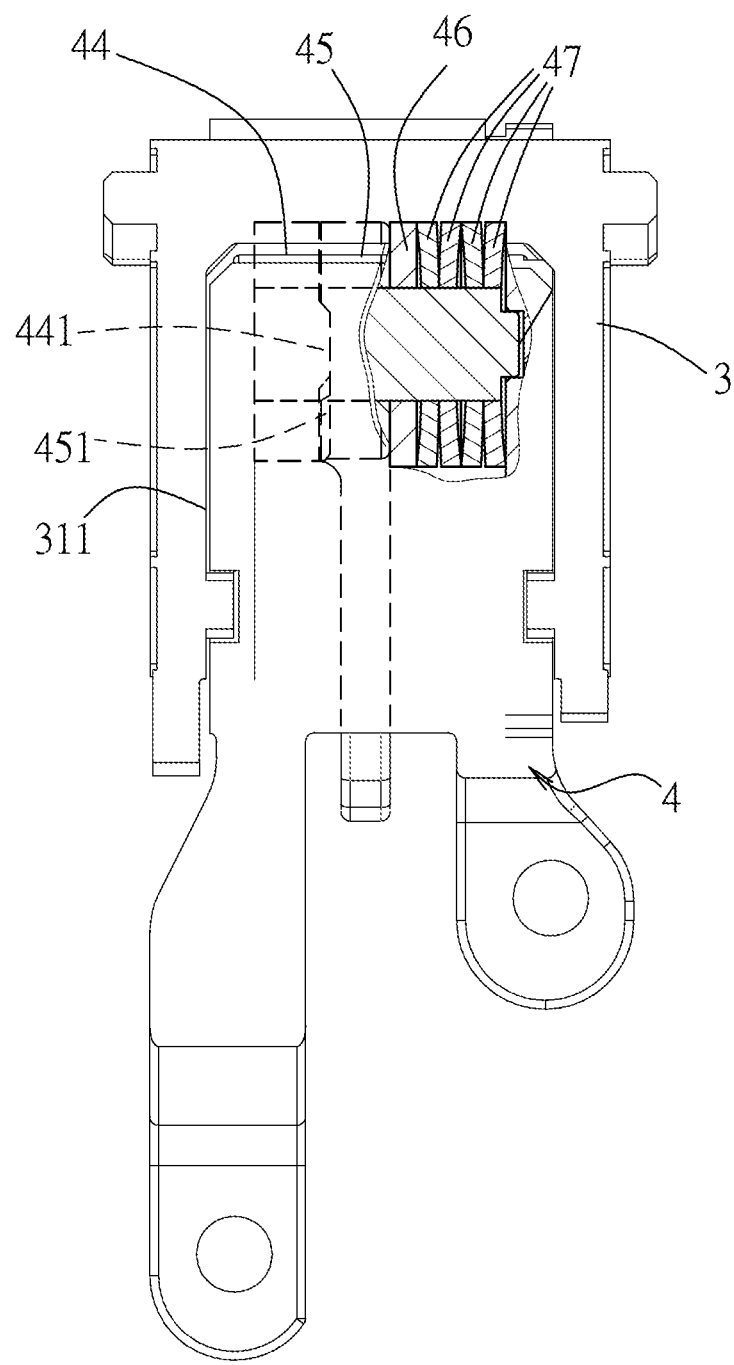
FIG. 11 is a partly sectional view, illustrating the hinge assembly of the embodiment in a fully folded state.
Figure 13:
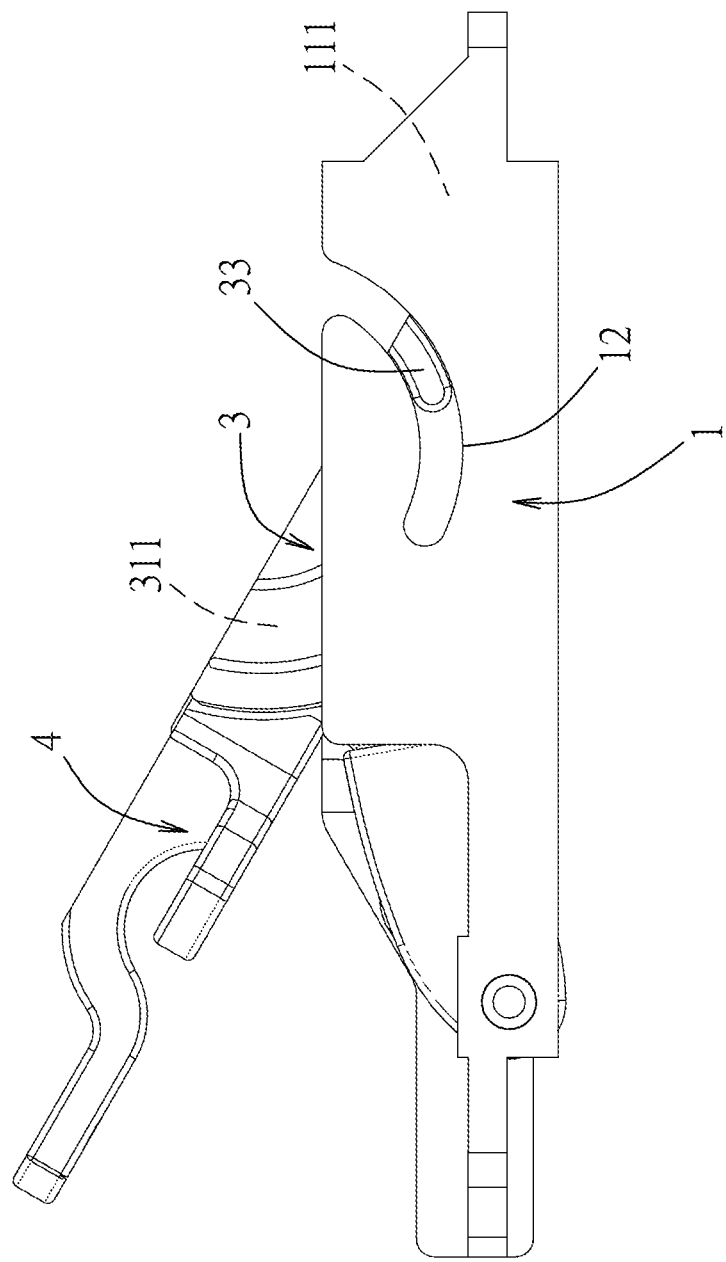
FIG. 13 is a side view, illustrating the hinge assembly of the embodiment in a first intermediate state.
Figure 14:
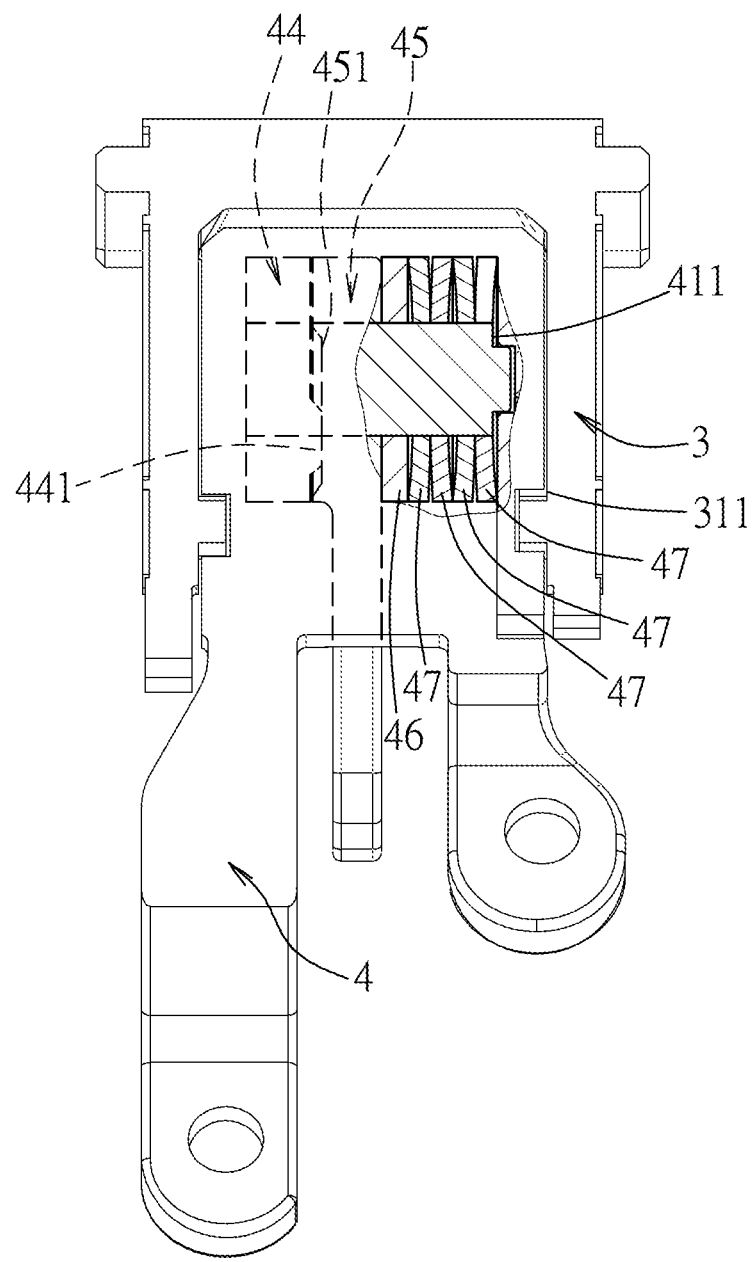
FIG. 14 is a partly sectional view, illustrating the hinge assembly of the embodiment in the first intermediate state.

As shown in FIGS. 9, 13 and 14, when the second hinge unit 4 is moved from the fully folded state to the first intermediate state by the restoring force generated by the torsional spring 2, the protrusion 441 slides to one side of the groove 451 so that the second hinge unit 4 stops moving in the first intermediate state. At this state, the second hinge unit 4 together with the guiding unit 3 is partially positioned away from the accommodating space 111, but the second hinge unit 4 is still situated in the receiving space 311 of the guide unit 3.

Figure 15:
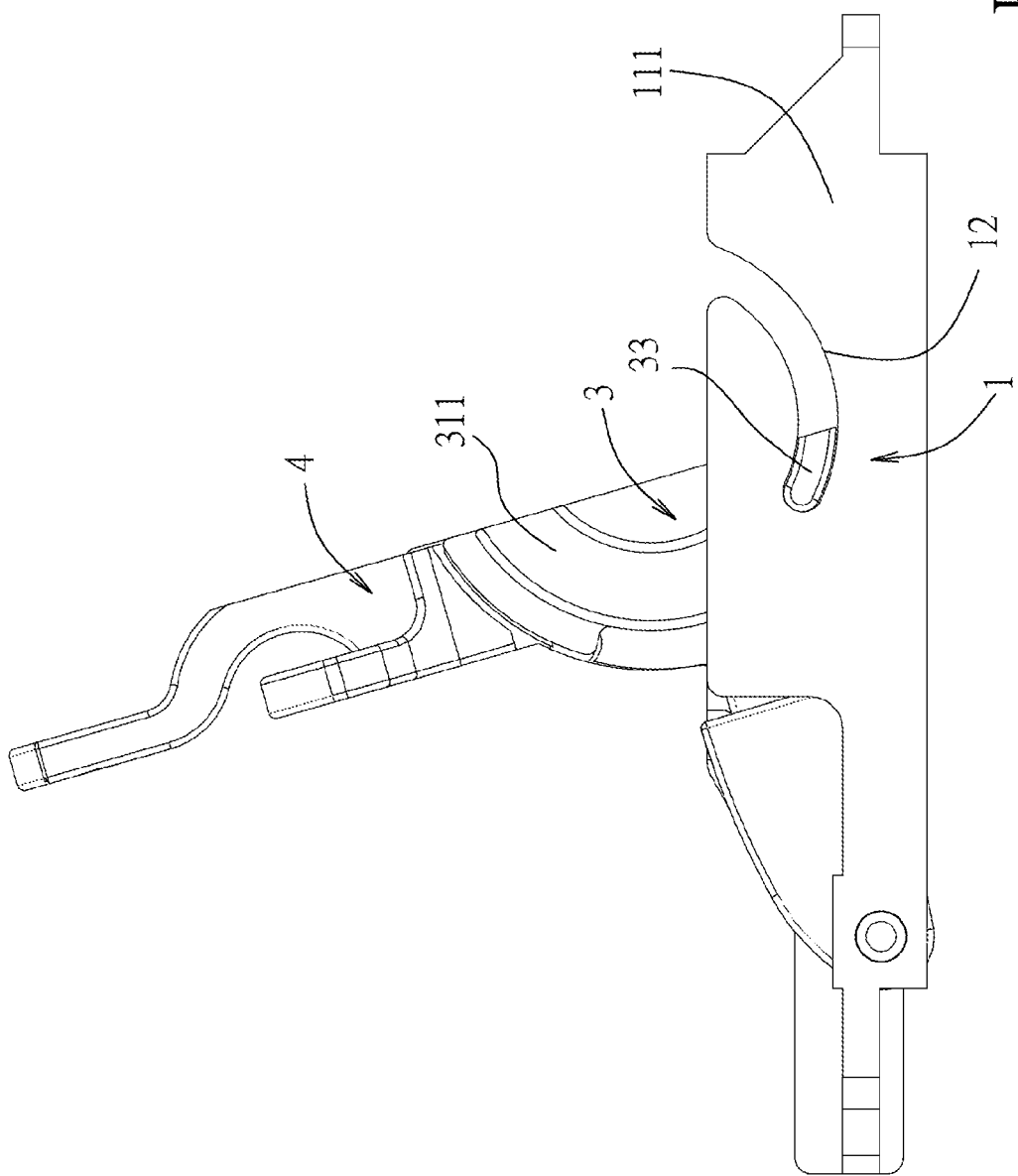
FIG. 15 is a side view, illustrating the hinge assembly of the embodiment in a second intermediate state.
Figure 16:
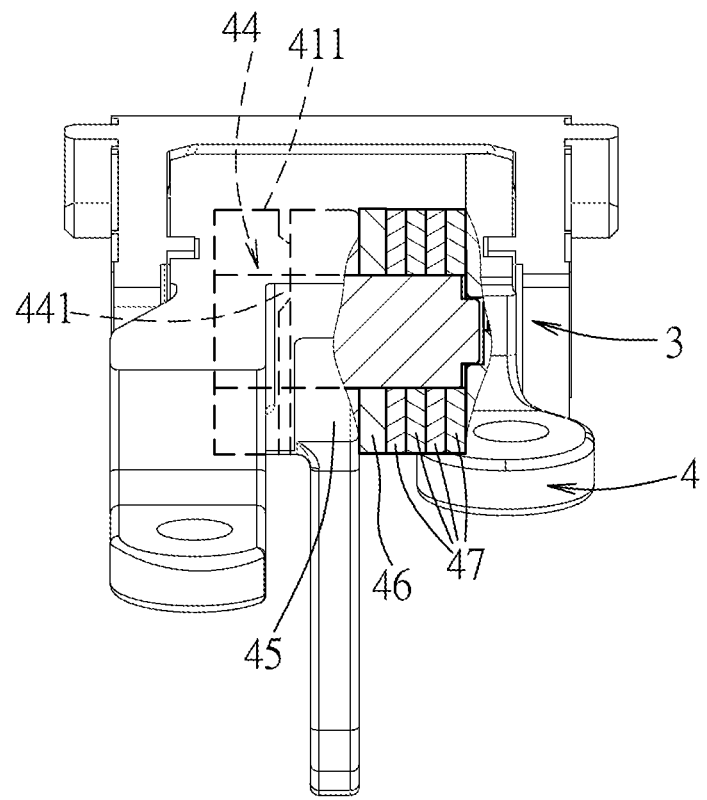
FIG. 16 is a partly sectional view, illustrating the hinge assembly of the embodiment in the second intermediate state.

As shown in FIGS. 9, 15 and 16, when the second hinge unit 4 rotates relative to the first hinge unit 1 to increase an angle between the electronic device 5 and the kickstand 6, the protrusion 441 slides along one side wall of the groove 451 so that the normal force provided by the resilient washers 47 increases gradually. Therefore, a larger application force is required to operate the kickstand 6. When the second hinge unit 4 is moved to the second intermediate state as shown in FIG. 15, the extension member 48 extends further outward from to the pivot arm 13, and most part of each of the guiding unit 3 and the second hinge unit 4 is positioned away from the accommodating space 111, but the second hinge unit 4 is still situated in the receiving space 311 of the guide unit 3.

Figure 17:
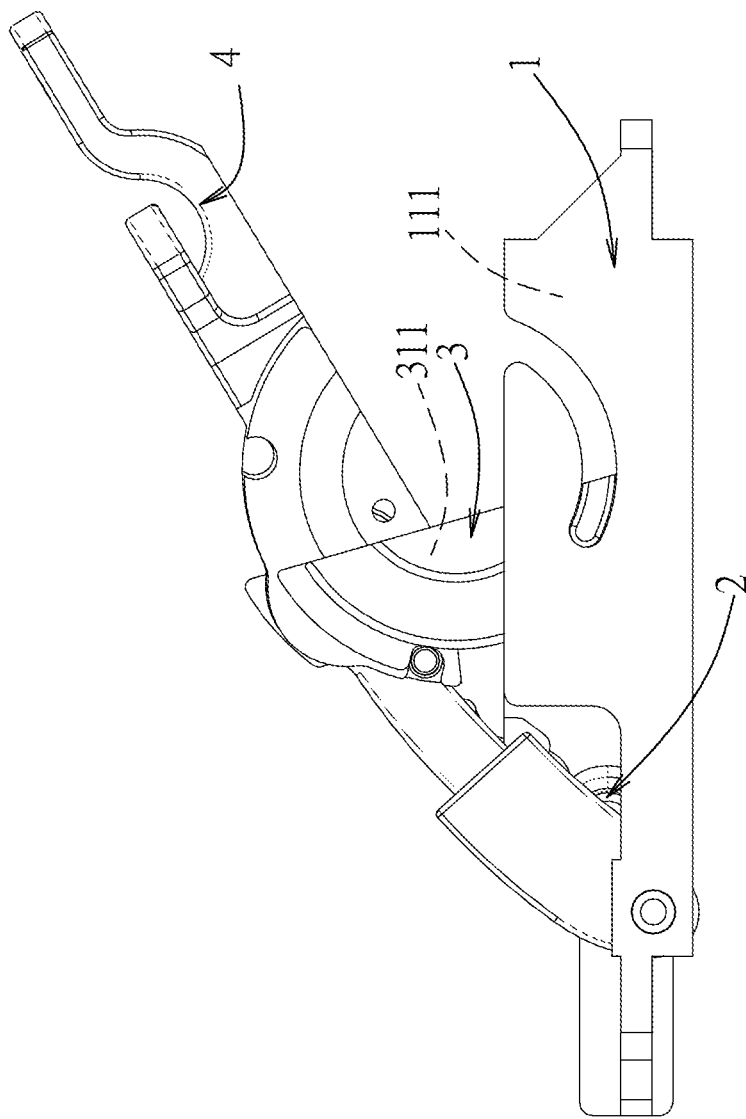
FIG. 17 is a side view, illustrating the hinge assembly of the embodiment in a fully unfolded state.
Figure 18:
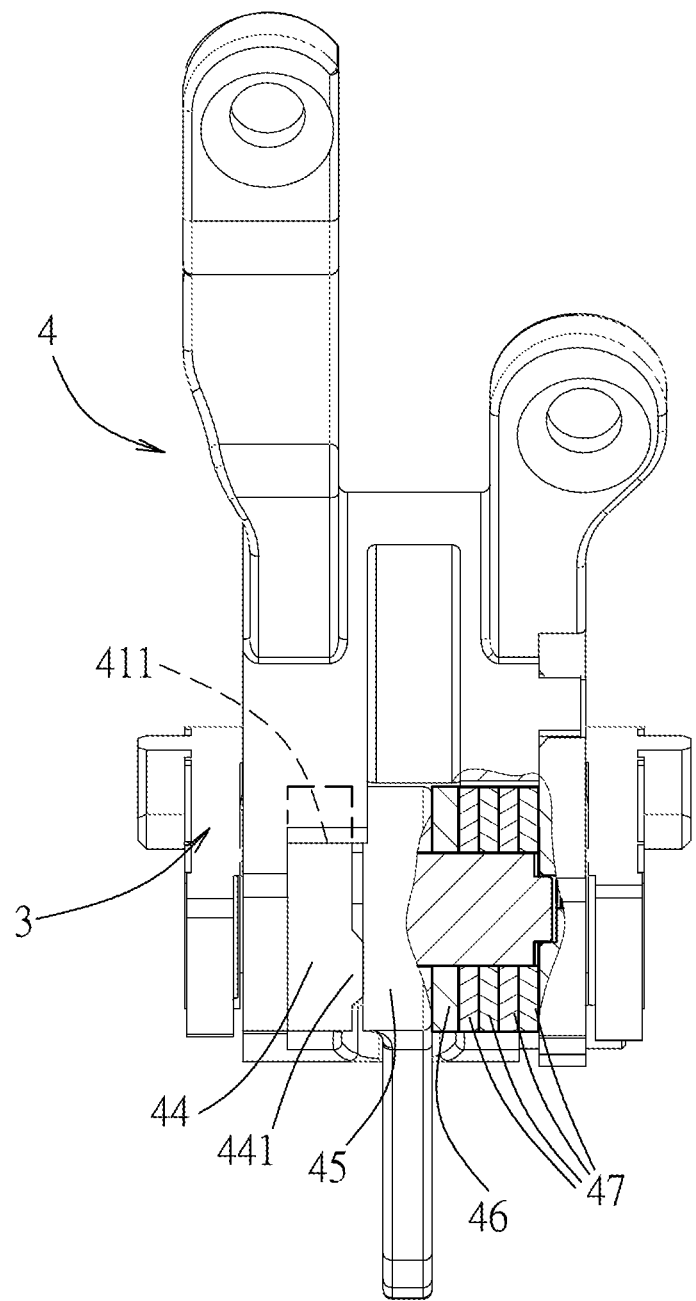
FIG. 18 is a partly sectional view, illustrating the hinge assembly of the embodiment in the fully unfolded state.

As shown in FIGS. 9, 17 and 18, when the second hinge unit 4 is in the fully unfolded state, the angle between the electronic device 5 and the kickstand 6 is maximum, most part of each of the second hinge unit 4 and the guiding unit 3 is positioned away from the accommodating space 111, and the second hinge unit 4 is displaced relative to the receiving space 311 of the guide unit 3. During transition to the fully unfolded state, because the protrusion 441 slides on the second contact surface 450, the amount of deformation of the resilient washers 47 is the largest, and the normal force imparted by the resilient washers 47 is the largest. Therefore, it is necessary to apply a force that is large enough to overcome the largest normal force for moving the kickstand 6 relative to the electronic device 5.

To sum up, through the provision of the second ring 45 that is connected to the extension member 48, the protrusion-and-groove arrangement that is disposed between the first and second rings 44, 45, and the resilient washers 47, the normal force exerted by the resilient washers 47 on the second ring can create a stable varying frictional resistance or torque against relative movement of the first and second hinge units 1, 4.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge assembly, comprising:
   a first hinge unit having an accommodating space and a pivotal arm;
   a guiding unit movably disposed in said accommodating space, slidably connected to said first hinge unit to slide arcuately relative to said first hinge unit; and
   a second hinge unit slidably connected to said guiding unit to slide arcuately relative to said guiding unit, said second hinge unit including
      a second hinge body having an installing space,
      a pivot shaft connected to said second hinge body and disposed in said installing space,
      a first ring sleeved on said pivot shaft, non-rotatable relative to said pivot shaft, and having a first contact surface,
      a second ring sleeved on said pivot shaft, rotatable relative to said pivot shaft, and having a second contact surface abutting said first contact surface of said first ring,
      at least one friction washer fitted around said pivot shaft and abutting a third contact surface of said second ring opposite to said second contact surface,
      a protrusion-and-groove arrangement disposed on said first and second contact surfaces to push said second ring against said at least one friction washer,
      at least one resilient washer sleeved on said pivot shaft to resiliently push said at least one friction washer against said third contact surface; and
      an extension member extending radially and outwardly from said second ring, and telescopically connected to said pivotal arm, wherein:
   said second hinge unit is rotatable relative to said first hinge unit between a fully folded state and a fully unfolded state;
   in the fully folded state, said second hinge unit and said guiding unit are entirely accommodated in said accommodating space, and said extension member and said pivotal arm are in a retracting state;
   in the fully unfolded state, most of each of said second hinge unit and said guiding unit is positioned away from said accommodating space, and said extension member and said pivotal arm are in an extended state.

2. The hinge assembly as claimed in claim 1, wherein said protrusion-and-groove arrangement has a protrusion projecting from said first contact surface of said first ring toward said second contact surface of said second ring, and a groove formed in said second contact surface to receive said protrusion, said protrusion being slidable on said second contact surface and in said groove when said second hinge unit rotates relative to said first hinge unit.

3. The hinge assembly as claimed in claim 2, wherein said pivot shaft has two curved surfaces and two planar surfaces each of which interconnects said curved surfaces, said first ring has a sleeving hole in interference fit with said pivot shaft, said at least one friction washer having a washer hole in interference fit with said pivot shaft, said second ring having a sleeving hole in clearance fit with said pivot shaft.

4. The hinge assembly as claimed in claim 3, wherein said first hinge unit further includes a first hinge body having said accommodating space, said pivotal arm being formed as a sleeve that is pivoted to said first hinge body and that is sleeved telescopically on said extension member.

5. The hinge assembly as claimed in claim 4, wherein:
said first hinge unit further includes two opposite first side plates disposed respectively at two opposite sides of said first hinge body, and two arcuate first sliding rails formed respectively in said first side plates, said accommodating space being disposed between said first slide plates;
said second hinge unit further includes two opposite second side plates that are disposed respectively at two opposite sides of said second hinge body and that are respectively formed with arcuate second sliding rails, said pivot shaft being connected between said second side plates; and
said guiding unit includes two plate bodies, and a connection rod interconnecting said plate bodies, each of said plate bodies having a first plate surface in abutment with one of said first slide plates, a second plate surface in abutment with one of said opposite second slide plates, a first projection extending from said first plate surface into one of said first sliding rails, and a second projection extending from said second plate surface into one of said second sliding rails.

6. The hinge assembly as claimed in claim 5, wherein one of said opposite second side plates is fixed to said second hinge body, said pivot shaft has one end fixed to said one of said second side plates, the other one of said second side plates being removably connected to another end of said pivot shaft.

7. The hinge assembly as claimed in claim 5, wherein:
said first hinge unit further includes a supporting post extending from one of said two opposite sides of said first hinge body, and a recessed abutment face disposed between said two opposite sides of said first hinge body;
said hinge assembly further includes a torsional spring having
a coiled body sleeved on said supporting post,
an inner free end extending from said coiled body, and abutting against said recessed abutment face, and
an outer free end extending from said coiled body, and having a bent portion; and
when said second hinge unit is in the fully folded state, said bent portion is compressed and deformed by said second hinge unit.

8. The hinge assembly as claimed in claim 1, wherein said at least one resilient washer includes four resilient washers.

* * * * *